United States Patent
Rodrigues

(10) Patent No.: US 11,085,377 B2
(45) Date of Patent: Aug. 10, 2021

(54) SHAFT BREAK DEVICE FOR AN ELECTRICITY GENERATOR

(71) Applicant: SAFRAN ELECTRICAL & POWER, Blagnac (FR)

(72) Inventor: Fernand Rodrigues, Blagnac (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 243 days.

(21) Appl. No.: 16/331,046

(22) PCT Filed: Sep. 6, 2017

(86) PCT No.: PCT/FR2017/052357
§ 371 (c)(1),
(2) Date: Mar. 6, 2019

(87) PCT Pub. No.: WO2018/050987
PCT Pub. Date: Mar. 22, 2018

(65) Prior Publication Data
US 2019/0211749 A1    Jul. 11, 2019

(30) Foreign Application Priority Data

Sep. 16, 2016 (FR) ...................... 1658672

(51) Int. Cl.
*F02C 7/32* (2006.01)
*F16D 9/08* (2006.01)
*F16D 1/116* (2006.01)

(52) U.S. Cl.
CPC .............. *F02C 7/32* (2013.01); *F16D 1/116* (2013.01); *F16D 9/08* (2013.01); *F05D 2220/76* (2013.01)

(58) Field of Classification Search
CPC ...... F02C 7/32; F02C 7/36; F02C 7/00; F16D 1/116; F16D 9/08
(Continued)

(56) References Cited

U.S. PATENT DOCUMENTS 4,150,566 A * 4/1979 Loebel .................... G01L 3/109
73/862.328
4,243,347 A * 1/1981 Clapp .................... B23D 43/04
407/15

(Continued)

FOREIGN PATENT DOCUMENTS

EP    0 974 013 A1    1/2000
FR    2 911 917 A1    8/2008
(Continued)

OTHER PUBLICATIONS

International Search Report dated Dec. 15, 2017 in PCT/FR2017/052357 filed Sep. 6, 2017.

*Primary Examiner* — Woody A Lee, Jr.
(74) *Attorney, Agent, or Firm* — Oblon, McClelland, Maier & Neustadt, L.L.P.

(57) ABSTRACT

An assembly including an accessory gearbox mechanically connected to an electricity generator having a support shaft that includes a calibrated breakable section designed to disconnect the electricity generator physically from the accessory gearbox when an incident is detected on the electricity generator, the protection device including an unlocking mechanism provided with a lock that, under the action of an external control unit, releases a cutting tool so as to cut said calibrated breakable section.

9 Claims, 2 Drawing Sheets

(58) Field of Classification Search
USPC .............................................................. 415/9
See application file for complete search history.

(56) References Cited

U.S. PATENT DOCUMENTS

| | | | | |
|---|---|---|---|---|
| 6,202,811 | B1 * | 3/2001 | Wallrafen | ................ F16D 13/58 |
| | | | | 192/30 W |
| 7,728,447 | B2 * | 6/2010 | Becquerelle | ......... H02K 11/042 |
| | | | | 290/3 |
| 2008/0238098 | A1 | 10/2008 | Becquerelle et al. | |

FOREIGN PATENT DOCUMENTS

| | | |
|---|---|---|
| SU | 503062 | 2/1976 |
| WO | WO 98/45613 A1 | 10/1998 |

* cited by examiner

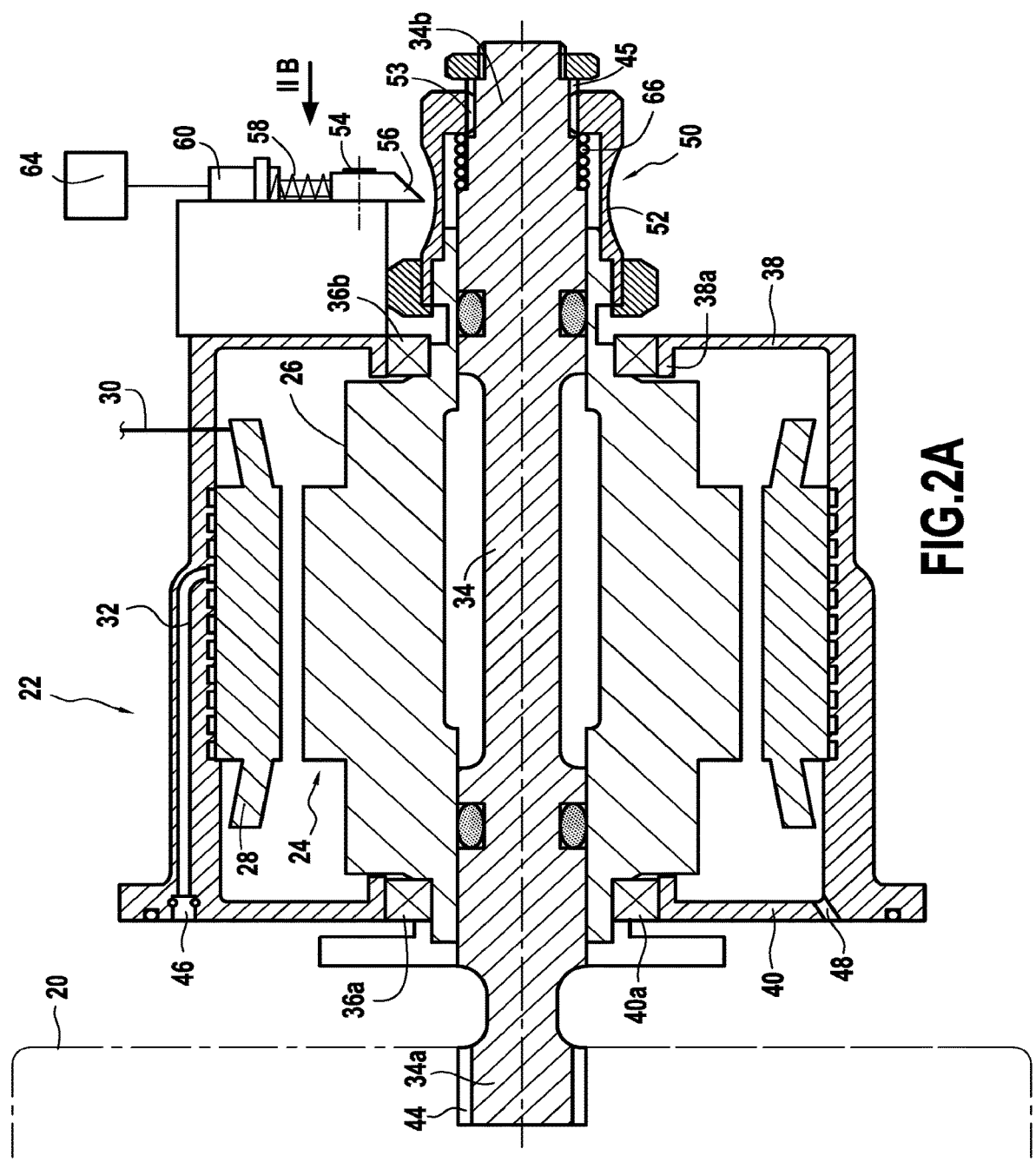

SHAFT BREAK DEVICE FOR AN ELECTRICITY GENERATOR

BACKGROUND OF THE INVENTION

The invention relates to gas turbines and more particularly to a device for protecting the accessory gearbox (AGB) and the engine that is associated therewith. The field of application of the invention is that of gas turbines for aeroengines: for airplanes or helicopters, as well as auxiliary power units (APUs).

In a gas turbine, a mechanical transmission drives various pieces of equipment, or accessories, using mechanical power taken from a turbine shaft. That mechanical transmission, which comprises a set of gearwheels housed in a casing, is referred to as the transmission gearbox or the accessory gearbox (AGB). The accessories comprise in particular various pumps for generating hydraulic energy, for supplying fuel, and for lubrication, and also one or more electrical starters and/or generators.

The electricity generators installed on airplanes are generally provided with protection devices having the function of physically separating the generator from the accessory gearbox when an incident is detected by an associated monitoring system. Conventionally, these protection devices are fitted both with a breakable section (a passive device) that is calibrated to break under torque corresponding to 5 to 10 times the maximum nominal or operational torque, and also with a controlled disconnection system (an active device) allowing the electricity generator to be mechanically disengaged (declutched) for intermediate loads and speeds.

Unfortunately, present-day controlled disconnection systems do not provide effective protection over their entire range of operation: low speed, high speed, intermediate torque. In particular, they do not enable disconnection under load or at very high speeds of rotation. Consequently, when failures occur that create high torque in the controlled disconnection system that is greater than the breaking capacity of the active device and less than the breaking torque of the breakable section, mechanical disengagement of the generator becomes impossible. This results in energy dissipation that can cause significant damage to the generator and even to the engine nacelle.

OBJECT AND SUMMARY OF THE INVENTION

It is therefore desirable to lower the breaking torque of the breakable section so that it is as close as possible to the torque for activating the controlled disconnection system and to do so only at that time.

To this end, the invention provides an assembly comprising an accessory gearbox provided with a protection device and mechanically connected to an electricity generator having a support shaft that includes a calibrated breakable section designed to disconnect the electricity generator physically from the accessory gearbox when an incident is detected on the electricity generator, the assembly being characterized in that the protection device comprises an unlocking mechanism provided with a lock that, under the action of an external control unit, releases a cutting tool so as to cut said calibrated breakable section.

Thus, the protection device of the invention may be designed to operate at a very low torque, as close as possible to 0 newton meters (Nm), which makes it possible to reduce the overall weight and size of the electricity generator in which it is integrated. Furthermore, due to the possibility of lowering the torque at which the breakable section is broken, it is possible for said breakable section to have inherent breaking torque that is greater, in particular in order to avoid untimely breakages and fatigue.

Preferably, said cutting tool acts against a thrust spring and has a punch with a carbide tip.

Advantageously, said unlocking mechanism is an electromagnet or a torque motor.

Preferably, said external control unit is integrated in the engine control unit (ECU) of an airplane engine or in the full-authority digital engine control (FADEC) of an airplane.

The assembly is mounted at a rear end of a housing in which said electricity generator is integrated, which housing has a front end designed to receive said accessory gearbox.

The invention further provides a gas turbine aeroengine provided with such a protection device.

BRIEF DESCRIPTION OF THE DRAWINGS

Other characteristics and advantages of the invention appear on reading the following description of particular embodiments of the invention, given by way of nonlimiting example with reference to the accompanying drawings, in which:

FIGS. 2A and 2B are respectively a view in axial section and an end view of an electricity generator associated with an accessory gearbox provided with a protection device of the invention.

DETAILED DESCRIPTION OF IMPLEMENTATIONS

Figure 1:
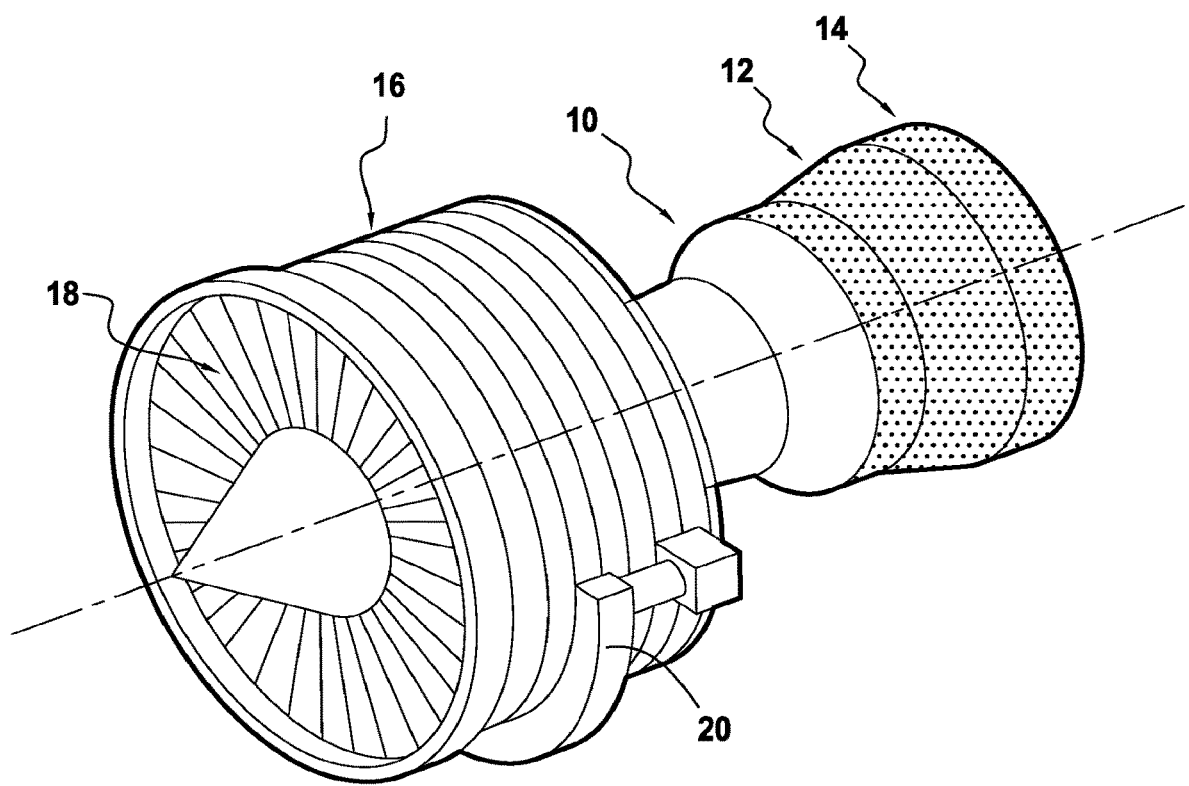
FIG. 1 is a highly simplified diagram of a gas turbine engine.

A field of application of the invention is that of gas turbine airplane engines, such as that shown very diagrammatically in FIG. 1, the invention nevertheless being applicable to other gas turbine aeroengines, typically helicopter engines, and also to gas turbine auxiliary power units.

The engine of FIG. 1 includes a combustion chamber 10, the combustion gas coming from the chamber driving a high-pressure turbine 12 and a low-pressure turbine 14. The high-pressure turbine is coupled by a shaft to a high-pressure compressor 16 feeding the combustion chamber 10 with air under pressure, while the low-pressure turbine is coupled via another shaft to a fan 18 at the inlet of the engine. An accessory gearbox 20 is mechanically connected by means of a power take-off to one of the turbine shafts, and it comprises a set of gearwheels for driving various accessories, including at least one electricity generator.

As shown in FIG. 2, the electricity generator 22 comprises a synchronous main generator 24 that is housed in a casing or housing 32 with the rotor of the generator, carrying the field (primary) windings 26, being mounted on a shaft 34 supported in the housing 32 by rolling bearings 36a, 36b. The stator of the generator carrying the armature (secondary) windings 28 is fastened to the housing 32 on its inside. The wiring harness 30, which conveys the voltage that is produced to a bus of an electrical power distribution circuit, such as an on-board network (not shown) of the airplane, is connected to the armature winding 28, e.g. by passing through the wall 32 in sealed manner.

The housing 32, generally in the shape of a cylinder, is closed at both of its ends 38, 40. At its front end, the housing 32 is closed by a wall 40 that presents a central opening defined by an annular portion 40a that is secured to the wall 40. The annular portion 40a carries the bearing 36a and also a seal for providing sealing relative to the cooling oil flowing in the housing (see the oil inlet 46 and outlet 48 orifices), e.g. a lip seal 42 having its end pressing on the outer surface of the support shaft 34, or any other sealing system, e.g. a rotary or labyrinth type seal. The support shaft 34 projects through the opening of the wall 40 by extending inside the housing 32 by means of a portion 34a that is, advantageously but not necessarily, of smaller diameter. This portion carries a mechanical coupling member, e.g. in the form of fluting 44, and extends beyond the fluting in order to connect to the accessory gearbox 20. At the other end, or rear end, the housing is closed, e.g. by bolting a wall 38, which presents a central opening defined by an annular portion 38a and carrying the bearing 36b. The support shaft 34 projects through the opening in the wall 38 and extends outside the housing 32 by means of a portion 34b that is optionally of smaller diameter. The portion 34b carries a mechanical coupling member, e.g. in the form of fluting 45, in order to connect to the generator 22.

The invention proposes providing a protection device 50 for protecting the accessory gearbox 20, and placing it behind the housing, at the end of the support shaft opposite from its end connected to the accessory gearbox. More precisely, the invention proposes adding a controlled lock to a breakable section 52 with its cutting tool 54 disposed at the rear end at the support shaft 34, which controlled lock serves to "weaken" the breakable section and thus cause it to break at the lowest possible torque (i.e. as close as possible to 0 Nm) so that the controlled disconnection system (active device of the prior art) becomes unnecessary. Thus, the reliability and the operational robustness of the prior art passive system is maintained, while the calibrated breakable section is conserved.

By way of example, the breakable section 52 has one end carrying additional fluting 53 cooperating with the fluting 45 to form the mechanical connection between the support shaft 34 and the field windings 26 of the generator 22.

It should be observed that this positioning behind the housing 32 makes it possible, after the breakable section has broken, and regardless of whether it was broken under the control of the control unit 64 or under the effect of a high torque (without specific control), to replace the electricity generator easily and without needing to disassemble it as a whole.

In order to ensure that the calibrated breakable section is cut through, the cutting tool has a punch with a carbide tip 56 acting against a thrust spring 58, and its cutting action is held back by a lock 62 of an electromagnet or torque motor type unlocking mechanism 60 operated by an external control unit 64, which may be dedicated or integrated into the ECU or FADEC of the airplane. The unlocking mechanism is operated by the external control unit when an incident is detected on the electricity generator by a monitoring system (not shown), which system is preferably integrated in the generator. Once the breakable section 52 has broken, a return spring 66 enables it to be separated cleanly into two separate parts.

Thus, with the protection device of the invention, mechanical disconnection is no longer based on a breaking torque that is 5 to 10 times higher than the nominal torque but on torque that is as close as possible to 0 Nm.

When the protection device is activated, the accessory gearbox 20 is disconnected from the generator 22 by the punch 56. Thus, the movement of the accessory gearbox 20 continues to drive the shaft 34 situated inside the rotor, but without the rotor being driven. The shaft 34 is in contact with the rotor via two bearings made of elastomer so as to limit any risk of seizing between the shaft and the rotor when the breakable section is broken.

The invention claimed is:

1. A gas turbine assembly comprising:
    an accessory gearbox mechanically connected to an electricity generator through a support shaft, the support shaft including a calibrated breakable section designed to disconnect the electricity generator physically from the accessory gearbox when an incident is detected on the electricity generator; and
    a protection device,
    wherein the protection device comprises an unlocking mechanism provided with a lock that, under the action of an external control unit, releases a cutting tool so as to cut said calibrated breakable section.

2. The assembly according to claim 1, wherein said cutting tool acts against a thrust spring.

3. The assembly according to claim 1, wherein said cutting tool has a punch with a carbide tip.

4. The assembly according to claim 1, wherein said unlocking mechanism is an electromagnet or a torque motor.

5. The assembly according to claim 1, wherein said external control unit is integrated in an engine control unit (ECUS) of an airplane engine or in a full-authority digital engine control (FADEC) of an airplane.

6. The assembly according to claim 1, wherein said protection device is mounted at a rear end of a housing wherein said electricity generator is integrated, which housing has a front end designed to receive said accessory gearbox.

7. The assembly according to claim 1, wherein said protection device further comprises a return spring enabling the calibrated breakable section, once the calibrated breakable section has broken, to be separated cleanly into two separate parts.

8. The assembly according to claim 1, wherein the calibrated breakable section includes a first end mechanically connected to field windings of the electricity generator and a second end mechanically connected to a first end of the support shaft.

9. The assembly according to claim 8, further comprising a housing in which the electricity generator is integrated, the housing includes a front end wall and rear end wall,
    wherein a first portion of the support shaft extends through an opening in the rear end wall such that the first end of the support shaft extends outside the housing, and
    wherein a second portion of the support shaft extends through the front end wall such that a second end of the support shaft is mechanically connected to the accessory gearbox.

* * * * *